United States Patent
Kwon et al.

(10) Patent No.: US 11,295,897 B2
(45) Date of Patent: Apr. 5, 2022

(54) MULTILAYER CAPACITOR AND MANUFACTURING METHOD FOR THE SAME

(71) Applicant: SAMSUNG ELECTRO-MECHANICS CO., LTD., Suwon-si (KR)

(72) Inventors: Yong Il Kwon, Suwon-si (KR); Jung Tae Park, Suwon-si (KR); Jin Kyung Joo, Suwon-si (KR); Ha Jung Song, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 131 days.

(21) Appl. No.: 16/536,621

(22) Filed: Aug. 9, 2019

(65) Prior Publication Data
US 2020/0265998 A1 Aug. 20, 2020

(30) Foreign Application Priority Data

Feb. 20, 2019 (KR) .................. 10-2019-0019696
Apr. 23, 2019 (KR) .................. 10-2019-0047167

(51) Int. Cl.
*H01G 4/30* (2006.01)
*H01G 4/12* (2006.01)
*H01G 4/248* (2006.01)
*H01G 4/012* (2006.01)

(52) U.S. Cl.
CPC .............. *H01G 4/30* (2013.01); *H01G 4/012* (2013.01); *H01G 4/12* (2013.01); *H01G 4/248* (2013.01)

(58) Field of Classification Search
CPC ............ H01G 4/12; H01G 2/06; H01G 2/065; H01G 4/005; H01G 4/012; H01G 4/232; H01G 4/30; H01G 4/38; H01G 4/248; H05K 1/182
See application file for complete search history.

(56) References Cited

U.S. PATENT DOCUMENTS

| 2015/0131199 | A1 | 5/2015 | Park et al. |
| 2015/0146343 | A1* | 5/2015 | Ellmore .............. H01G 2/103 361/301.4 |
| 2018/0012706 | A1* | 1/2018 | Bultitude ............ H01G 4/002 |
| 2019/0164693 | A1* | 5/2019 | Ono ...................... H01G 4/30 |

FOREIGN PATENT DOCUMENTS

| JP | 2009-71106 A | 4/2009 |
| KR | 10-2015-0053424 A | 5/2015 |

* cited by examiner

*Primary Examiner* — Michael P McFadden
(74) *Attorney, Agent, or Firm* — Morgan, Lewis & Bockius LLP

(57) ABSTRACT

A multilayer capacitor includes: a capacitor body formed by placing two or more stacked units in a row in a stacking direction of dielectric layers, each stacked unit including a plurality of dielectric layers, and a plurality of first and second internal electrodes alternately disposed with the dielectric layers interposed therebetween; and first and second external electrodes disposed on the capacitor body to be electrically connected to the first and second internal electrodes, respectively, and, in the capacitor body, adjacent stacked units are disposed to allow surfaces with similar density to be adjacent to each other.

17 Claims, 7 Drawing Sheets

MULTILAYER CAPACITOR AND MANUFACTURING METHOD FOR THE SAME

CROSS-REFERENCE TO RELATED APPLICATION(S)

This application claims the benefit of priority to Korean Patent Applications Nos. 10-2019-0019696 filed on Feb. 20, 2019 and 10-2019-0047167 filed on Apr. 23, 2019 in the Korean Intellectual Property Office, the disclosures of which are incorporated herein by reference in their entirety.

TECHNICAL FIELD

The present disclosure relates to a multilayer capacitor and a method for manufacturing the same.

BACKGROUND

A multilayer capacitor, among passive components, such as a multilayer ceramic capacitor (MLCC), serves to control an electric signal on a circuit.

A main role of a multilayer capacitor is to accumulate charge in an electrode, and to serve as a filter to block a direct current (DC) signal and to pass an alternating current (AC) signal.

In other words, a multilayer capacitor may stabilize an integrated circuit (IC) operation by bypassing and removing AC noise from a power line.

Recently, as technology, such as fifth generation (5G) systems, electric products, servers, and the like, advances, the demand for multilayer capacitors in this field is also increasing.

As an example, in the case of 5G mobile phones, as compared with 4G phones currently in use, it is expected that the use of multilayer capacitors will be increased two or threefold.

One characteristic of a multilayer capacitor is the characteristic of break down voltage (BDV).

BDV refers to a voltage in which dielectric breakdown of a ceramic occurs when a voltage, applied to a multilayer capacitor, is increased. This dielectric breakdown is known to occur due to a sudden rise in temperature due to leakage current in a locally thin portion of a dielectric.

In detail, if a capacitor is deformed to have an irregular shape while a layer thickness or shape of an end of an internal electrode, stacked in a capacitor body, is nonuniform due to the difference in levels between a dielectric layer and an internal electrode, it may be vulnerable to dielectric breakdown.

Meanwhile, this deformation is more significant in the case of a highly-stacked multilayer capacitor in which the sum of the difference in levels between a dielectric layer and an internal electrode is great.

Recently, in the case of a server-based product, a highly-stacked internal electrode having 800 to 1500 layers is used to implement high capacity, and thus this deformation may become a serious problem.

SUMMARY

An aspect of the present disclosure is to provide a multilayer capacitor capable of reducing a thickness deviation between an internal electrode and a dielectric layer in the entirety of a capacitor body and end bending of an internal electrode, and a method of manufacturing the same.

According to an aspect of the present disclosure, a multilayer capacitor includes: a capacitor body formed by placing two or more stacked units in a row in a stacking direction of dielectric layers, each stacked unit including a plurality of dielectric layers, and a plurality of first and second internal electrodes alternately disposed with the dielectric layers interposed therebetween; and first and second external electrodes disposed on the capacitor body to be electrically connected to the first and second internal electrodes, respectively. In the capacitor body, adjacent stacked units are disposed to allow surfaces, corresponding to a high density portion, to oppose each other, or surfaces, corresponding to a low density portion, to oppose each other.

The capacitor body may further include a buffer layer disposed between the adjacent stacked units.

The capacitor body may include: a first stacked unit having a lower density portion of the dielectric layers located in an upper portion of the first stacked unit in the stacking direction; and a second stacked unit disposed in a lower side of the first stacked unit in the stacking direction and having a higher density portion of the dielectric layers located in an upper portion of the second stacked unit in the stacking direction.

The capacitor body may include: a first stacked unit having a lower density portion of the dielectric layers located in an upper portion of the first stacked unit; and a second stacked unit disposed in a lower side of the first stacked unit in the stacking direction and having a higher density portion of the dielectric layers located in an upper portion of the second stacked unit in the stacking direction, and the first stacked unit and the second stacked unit are alternately stacked one after another.

According to another aspect of the present disclosure, a multilayer capacitor includes: a capacitor body including two or more stacked units stacked in a row in a stacking direction of dielectric layers, each of the two or more stacked units including a plurality of dielectric layers and a plurality of first and second internal electrodes alternately disposed with a respective dielectric layer interposed therebetween; and first and second external electrodes disposed on the capacitor body and electrically connected to the first and second internal electrodes, respectively. In each of the two or more stacked units, lengths of the plurality of first and second internal electrodes in a width direction of the capacitor body become less upwardly or downwardly from a middle portion of each of the two or more stacked units.

Each of the two or more stacked units may satisfy W2/W1≥0.96, where a maximum length of an internal electrode among the plurality of first and second internal electrodes in the width direction is defined as "W1", and a minimum length of an internal electrode among the plurality of first and second internal electrodes in the width direction is defined as "W2".

According to another aspect of the present disclosure, a method for manufacturing a multilayer capacitor includes: preparing a stacked bar including a plurality of ceramic sheets, and a plurality of first and second internal electrodes alternately disposed with a respective ceramic sheet interposed therebetween; preparing a stack by placing two or more stacked bars in a row such that surfaces of the two or more stacked bars, corresponding to a higher density portion of the ceramic sheets or to a lower density portion of the ceramic sheets, are adjacent to each other; compressing the stack; preparing a capacitor body by cutting and sintering the compressed stack to expose portions of the plurality of first and second internal electrodes; and forming first and second external electrodes on the capacitor body to be electrically connected to the exposed portions of the plurality of first and second internal electrodes, respectively.

In the preparing of the stack, the stack may be formed by placing a buffer layer between adjacent stacked bars.

In the preparing of the stack, the stack may be formed by placing a first stacked bar having a higher density portion of the ceramic sheets located in an upper portion of the first stacked bar, and stacking a second stacked bar above the first stacked bar, in which a lower density portion of the ceramic sheets located in an upper portion of the second stacked bar.

The stack may include a plurality of first and second stacked bars, and may be formed by stacking the first stacked bar and the second stacked bar to be alternately disposed one after another.

In the preparing of the stack, alignment of the stacked bar may be performed using a matching stacker, after a hole is processed in each of the stacked bars with a laser drill.

According to another aspect of the present disclosure, a method for manufacturing a multilayer capacitor includes: preparing a stacked bar, including a plurality of ceramic sheets, and a plurality of first and second internal electrodes alternately disposed with a respective ceramic sheet interposed therebetween; preparing a stack by placing two or more stacked bars in a row such that surfaces of the two or more stacked bars, on which ceramic sheets are stacked firstly, are adjacent to each other, or that surfaces of the two or more stacked bars, on which ceramic sheets are stacked finally, are adjacent to each other; compressing the stack; preparing a capacitor body by cutting and sintering the compressed stack to expose portions of the plurality of first and second internal electrodes; and forming first and second external electrodes on the capacitor body to be electrically connected to the exposed portions of the plurality of first and second internal electrodes, respectively.

In the preparing of the stack, the stack may be formed by placing a first stacked bar having a surface with a firstly stacked ceramic sheet located in an upper portion of the first stacked bar, and stacking a second stacked bar above the first stacked bar, in which a surface with a finally stacked ceramic sheet located in an upper portion of the second stacked bar.

Other features and aspects will be apparent from the following detailed description, the drawings, and the claims.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
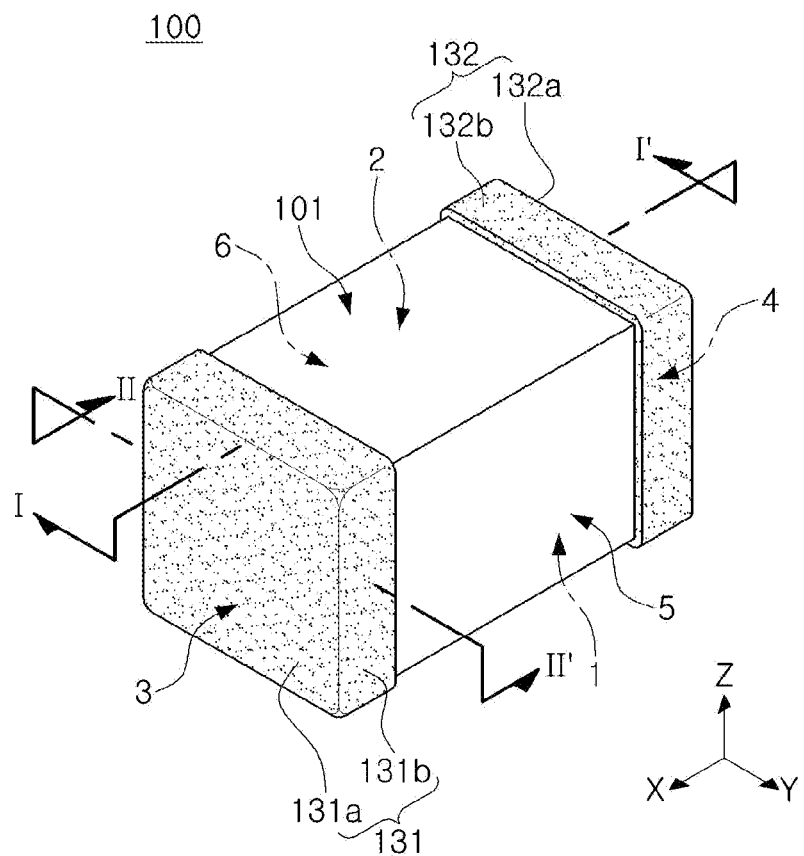
FIG. 1 is a schematic perspective view of a multilayer capacitor according to a first embodiment.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Hereinafter, when directions of a capacitor body 101 are defined to clearly describe embodiments in the present disclosure, X, Y, and Z on the drawings indicate a length direction, a width direction, and a thickness direction of the capacitor body 101, respectively.

Moreover, in an embodiment, the Z direction may be used as having the same meaning as a stacking direction in which dielectric layers are stacking on each other.

In addition, in an embodiment, for convenience of explanation, both sides of the capacitor body 101, opposing each other in a Z direction, are defined as a first surface 1 and a second surface 2, both sides, connected to the first surface 1 and the second surface 2 and opposing each other in an X direction, are defined as a third surface 3 and a fourth surface 4, and both sides connected to the first surface 1 and the second surface 2, connected to the third surface 3 and the fourth surface 4, and opposing each other in a Y direction, are defined as a fifth surface 5 and a sixth surface 6.

In an embodiment, the mounting surface of the multilayer capacitor 100 may be a first surface S1 of the capacitor body 101.

Moreover, in a stacked unit which will be described below, it may be described that both sides of the stacked unit, opposing each other in an X direction, are defined as the third surface 3 and the fourth surface 4, and both sides, opposing each other in a Y direction, are defined as the fifth surface 5 and the sixth surface 6.

Figure 2:
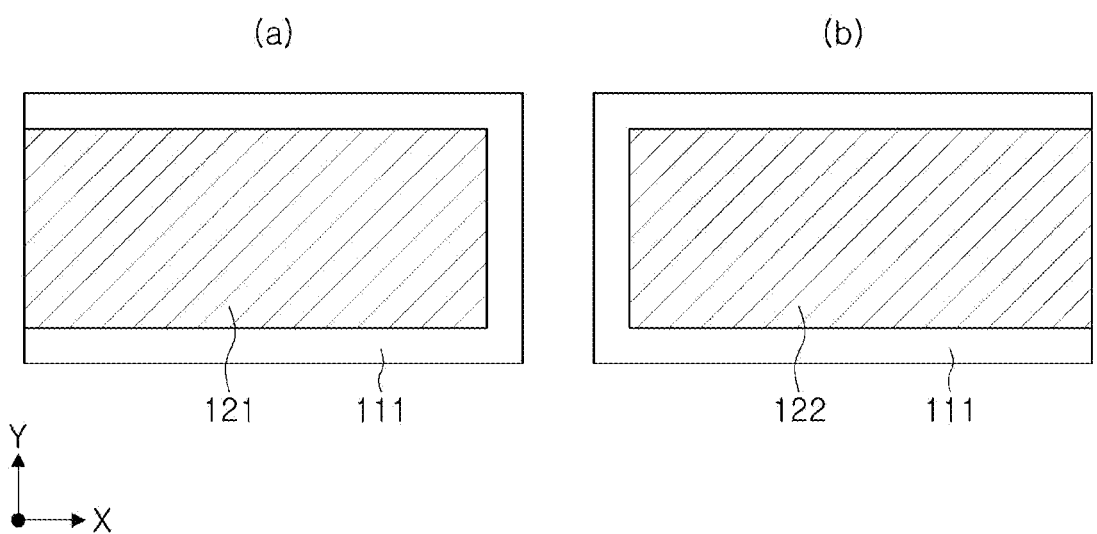
FIG. 2 is a plan view illustrating an internal electrode included in a first stacked unit of FIG. 1.
Figure 3:
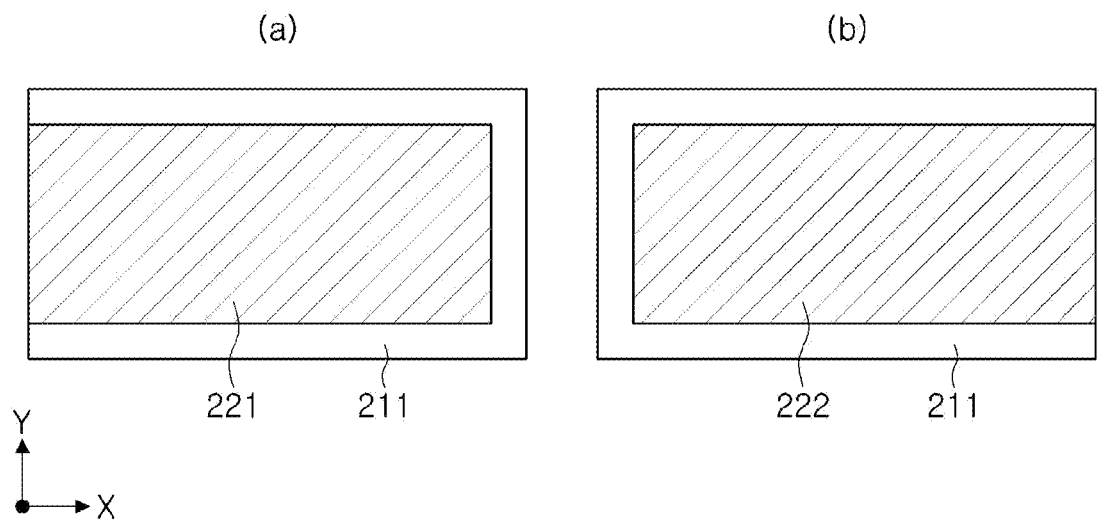
FIG. 3 is a plan view illustrating an internal electrode included in a second stacked unit of FIG. 1.
Figure 4:
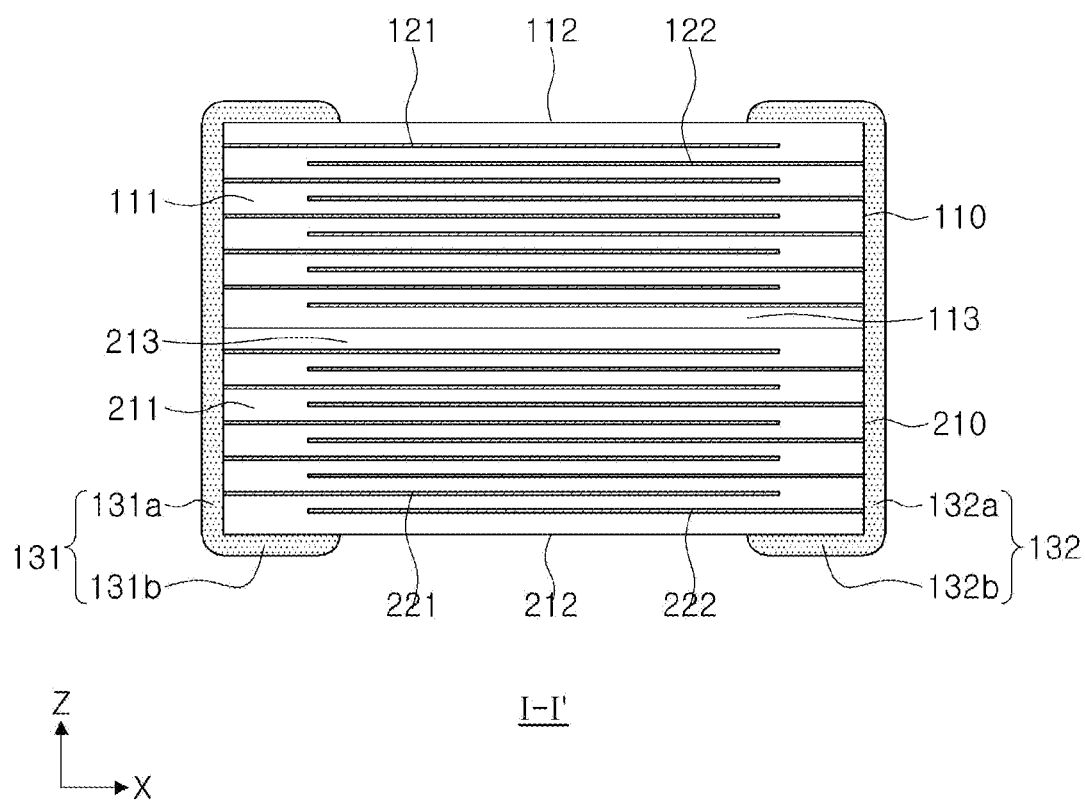
FIG. 4 is a cross-sectional view taken along line I-I' of FIG. 1.
Figure 5:
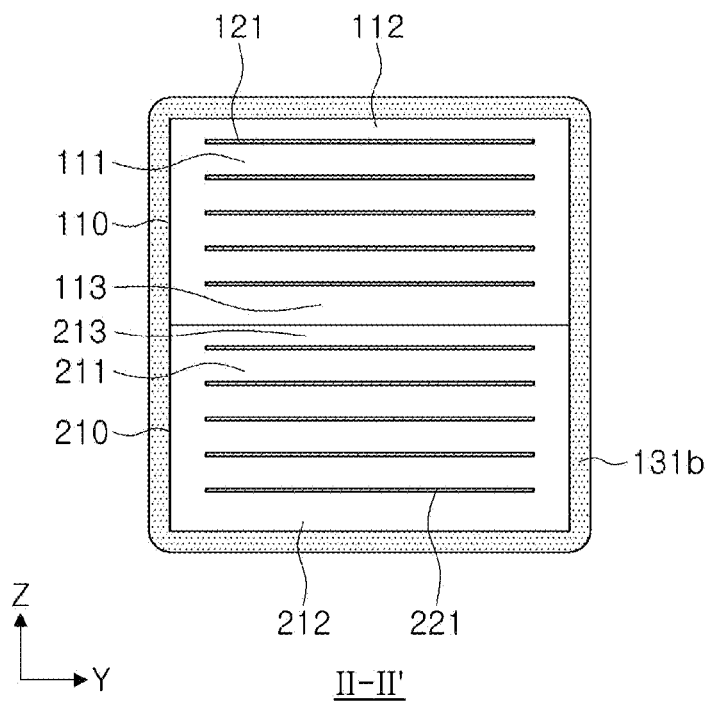
FIG. 5 is a cross-sectional view taken along line II-II' of FIG. 1.

FIG. 1 is a schematic perspective view illustrating a multilayer capacitor according to a first embodiment, FIG. 2 is a plan view illustrating an internal electrode included in a first stacked unit of FIG. 1, FIG. 3 is a plan view illustrating an internal electrode included in a second stacked unit of FIG. 1, FIG. 4 is a cross-sectional view taken along line I-I' of FIG. 1, and FIG. 5 is a cross-sectional view taken along line II-II' of FIG. 1.

Referring to FIGS. 1 through 5, a multilayer capacitor 100 according to an embodiment may include a capacitor body 101 and first and second external electrodes 131 and 132.

Moreover, the capacitor body 101 is formed by placing two or more stacked units 110 and 210 in a row in the Z direction, a stacking direction of the dielectric layers 111 and 211, and the two or more stacked units 110 and 210 include a plurality of dielectric layers 111 and 211, and a plurality of first internal electrodes 121 and 221 and second internal electrodes 122 and 222, alternately disposed with the dielectric layers 111 and 211 interposed therebetween.

Hereinafter, in an embodiment, a stacked unit is illustrated in which the stacked unit includes a first stacked unit in an upper side and a second stacked unit in a lower side, but the present disclosure is not limited thereto. If necessary, three or more stacked units are stacked in a row in the Z direction to form a capacitor body.

In addition, in an embodiment, a second stacked unit is the same as the first stacked unit, inverted 180° in the Z direction. Hereinafter, a structure of a stacked unit will be described based on the first stacked unit, and the description of the second stacked unit, overlapped with that of the first stacked unit, will be omitted. However, it is considered that the description of the stacked unit includes that of the second stacked unit.

In the description of the second stacked unit among the drawings, a reference numeral 211 indicates a dielectric layer, reference numerals 221 and 222 indicate first and second internal electrodes, respectively, and reference numerals 212 and 213 indicate a cover.

The plurality of dielectric layers 111, forming a first stacked unit 110, are stacked in the Z direction and then sintered, and adjacent dielectric layers 111 of the first stacked unit 110 are integrated so that boundaries therebetween are not readily apparent without using a scanning electron microscope (SEM).

In this case, the first stacked unit 110 may have a substantially hexahedral shape, but the present disclosure is not limited thereto. Moreover, a shape and a dimension of the first stacked unit 110, and a stacking number of dielectric layers 111 are not limited to those illustrated in the drawings of an embodiment.

The dielectric layers 111 may include a ceramic material having high permittivity, for example, a barium titanate ($BaTiO_3$)-based ceramic powder or a strontium titanate ($SrTiO_3$)-based ceramic powder, but the present disclosure is not limited thereto so long as a sufficient degree of capacitance may be obtained.

Moreover, a ceramic additive, an organic solvent, a plasticizer, a binder, a dispersant, and the like may also be added to the dielectric layers 111 along with the ceramic powder.

The ceramic additive may be, for example, a transition metal oxide or a transition metal carbide, a rare earth element, magnesium (Mg), aluminum (Al), or the like.

The first stacked unit 110 may include an active region as a portion contributing to formation of the capacity of a capacitor, and covers 112 and 113 formed in an upper portion and a lower portion of the active region in the Z direction as upper and lower margin portions.

The covers 112 and 113 may have the same material and configuration as those of the dielectric layers 111 except that the covers 112 and 113 do not include internal electrodes.

These covers 112 and 113 may be formed by stacking a single dielectric layer or two or more dielectric layers on upper and lower surfaces of the active region in the Z direction, respectively, and may fundamentally prevent damage to the first and second internal electrodes 121 and 122 caused by physical or chemical stress.

In this case, thicknesses of the covers 112, 113, 212, and 213 are preferably above a certain level so as to prevent the capacitor body 101 from being damaged by an external shock, or the like, when the first stacked unit 110 and the second stacked unit 210 form the capacitor body 101.

In detail, one side of a stacked unit is a surface in contact with another stacked unit. In this case, in order to maintain an interval of adjacent internal electrodes to be constant, it is preferable that a thickness of a cover of the side, the surface in contact with another stacked unit as described above, is formed to be less thick than a thickness of an opposite cover.

For example, in an embodiment, in the case of the first stacked unit 110, the upper cover 112 is preferably formed by stacking two or more dielectric layers. In the case of the second stacked unit 210, the lower cover 212 is preferably formed by stacking two or more dielectric layers.

The first and second internal electrodes 121 and 122 are electrodes receiving different polarities, and are alternately disposed in the Z direction with the dielectric layer 111 interposed therebetween. One ends of the first and second internal electrodes may be exposed through the third surface 3 and the fourth surface 4 of the first stacked unit 110, respectively.

In this case, the first and second internal electrodes 121 and 122 may be electrically isolated from each other by the dielectric layers 111 interposed therebetween.

As described above, the ends of the first and second internal electrodes 121 and 122, alternately exposed through the third surface 3 and the fourth surface 4 of the first stacked unit 110, are in contact with and electrically connected to the first and second external electrodes 131 and 132, disposed on the third surface 3 and the fourth surface 4 of the capacitor body 101, which will be described later.

According to the above configuration, when a predetermined voltage is applied to the first and second external electrodes 131 and 132, charges are accumulated between the first and second internal electrodes 121 and 122.

In this case, the capacitance of the multilayer capacitor 100 is proportional to an area of overlap between the first and second internal electrodes 121 and 122, overlapped in the Z direction in an active region of the capacitor body 101.

Moreover, a material, forming the first and second internal electrodes 121 and 122, is also not particularly limited, and for example, may be a precious metal such as platinum (Pt), palladium (Pd) or a palladium-silver (Pd—Ag) alloy, and a conductive paste including one or more of nickel (Ni) and copper (Cu).

In this case, a method of printing the conductive paste such as screen printing or gravure printing may be used, but the present disclosure is not limited thereto.

A capacitor body of a multilayer capacitor may have different densities of stacked dielectric layers (or ceramic sheets) between upper and lower parts of the capacitor body due to stacking pressure accumulated during the manufacturing process. To address this issue, according to an exemplary embodiment of the present disclosure, first and second stacked units 110 and 210 may be disposed to allow surfaces, corresponding to a higher density portion, to be adjacent to each other. That is, the first and second stacked units 110 and 210 are arranged such that the higher density portion of the first stacked unit 110 and the higher density portion of the second stacked unit 210 are facing each other.

Alternately, although not illustrated, if necessary, the first and second stacked units 110 and 210 may be disposed to allow surfaces, corresponding to a lower density portion, to be adjacent to each other. That is, the first and second stacked units 110 and 210 are arranged such that the lower density portion of the first stacked unit 110 and the lower density portion of the second stacked unit 210 are facing each other.

Meanwhile, in the capacitor body 101, the first and second stacked units 110 and 210 may be disposed to allow surfaces, corresponding to the first stacked portions, to be adjacent to each other.

In this case, as needed, the first and second stacked units 110 and 210 may be disposed to allow surfaces, corresponding to the final stacked portions, to be adjacent to each other.

The first and second external electrodes 131 and 132 may receive voltages having different polarities, may be disposed on the third surface 3 and the fourth surface 4 of the capacitor body 101, and may be in contact with and electrically connected to exposed portions of the first and second internal electrodes 121 and 122 in the first and second stacked units 110 and 210.

In this case, if necessary, the first and second external electrodes 131 and 132 may include a conductive layer formed on the third surface 3 and the fourth surface 4 of the capacitor body 101, and a plated layer formed on the conductive layer.

The plated layer may include a Ni plated layer formed on the conductive layer and a tin (Sn) plated layer formed on the Ni plated layer.

The first external electrode 131 may include a first connection portion 131a and a first band portion 131b.

The first connection portion 131a is a portion formed on the third surface 3 of the capacitor body 101 and in contact with exposed portions of the first internal electrodes 121 and 221, while the first band portion 131b is a portion extended from the first connection portion 131a to the first surface 1 of the capacitor body 101.

In this case, the first band portion 131b may be further extended to portions of the fifth surface 5 and the sixth surface 6 and a portion of the second surface 2 of the capacitor body 101, to improve adhesion strength.

The second external electrode 132 may include a second connection portion 132a and a second band portion 132b.

The second connection portion 132a is a portion formed on the fourth surface 4 of the capacitor body 101 and in contact with exposed portions of the second internal electrodes 122 and 222, while the second band portion 132b is a portion extended from the second connection portion 132a to the first surface 1 of the capacitor body 101.

In this case, the second band portion 132b may be further extended to portions of the fifth surface 5 and the sixth surface 6 and a portion of the second surface 2 of the capacitor body 101, to improve adhesion strength.

In an embodiment, in the case of the first stacked unit 110, an upper portion may be a lower density portion, while a lower portion may be a higher density portion.

In this case, in the case of the first stacked unit 110, when a stacked unit is manufactured, an upper portion may be allowed to be the final stacked portion, while a lower portion may be allowed to be the first stacked portion.

Moreover, in an embodiment, the second stacked unit 210 may be disposed in a lower side of the first stacked unit 110.

In the second stacked unit 210, an upper portion may be a higher density portion, while a lower portion may be a lower density portion.

In this case, in the case of the second stacked unit 210, when a stacked unit is manufactured, an upper portion may be allowed to be the first stacked portion, while a lower portion may be allowed to be the final stacked portion.

Figure 6:
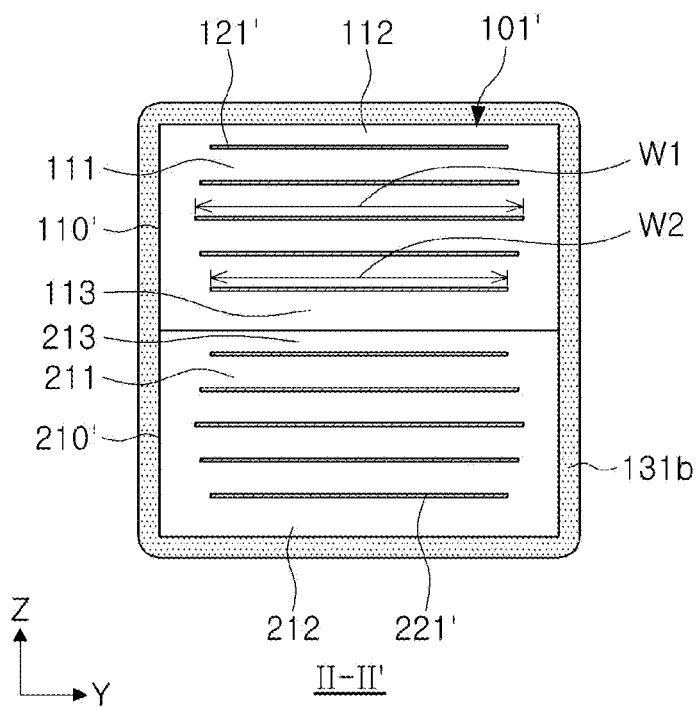
FIG. 6 is a cross-sectional view taken along line II-II' of FIG. 1 in a multilayer capacitor according to a second embodiment.

Meanwhile, referring to FIG. 6, in first and second stacked units 110' and 210', a width of a first internal electrode or a second internal electrode may be formed to be narrower upwardly or downwardly in the Z direction from a middle portion of the stacked unit.

In other words, when viewed from a third surface of the first stacked unit 110', in a first internal electrode 121', a width of the first internal electrode 121' in the Y direction, disposed in the middle in the Z direction, is the longest, while a width of the first internal electrode 121' in the Y direction may be gradually shortened upwardly or downwardly in the Z direction.

Moreover, although not illustrated, when viewed from the fourth surface of the first stacked unit 110', in the case of a second internal electrode, a form and a structure thereof may be substantially similar to those of the first internal electrode 121'.

In addition, when viewed from a third surface of the second stacked unit 210', in a first internal electrode 221', a width of the first internal electrode 221' in the Y direction, disposed in the middle in the Z direction, is the longest, while a width of the first internal electrode 221' in the Y direction may be gradually shortened upwardly or downwardly in the Z direction.

Moreover, although not illustrated, when viewed from the fourth surface of the second stacked unit 210', in the case of a second internal electrode, a form and a structure thereof may be substantially similar to those of the first internal electrode 221'.

In this regard, when viewed from each of the third surface and the fourth surface of the capacitor body 101', an exposed shape of an internal electrode in the Z direction as a whole may be a snowman-like shape in the Z-direction.

Moreover, the first and second stacked units 110' and 210' may satisfy W2/W1≥0.96, when a maximum width of the first internal electrode or the second internal electrode is defined as W1, and a minimum width of the first internal electrode or the second internal electrode is defined as W2. As the ratio is closer to 1, a width of an internal electrode is more uniform. Thus, in an embodiment, a thickness of the internal electrode is also uniform as a whole, so breakdown voltage characteristics of a multilayer capacitor may be improved.

Figure 14:
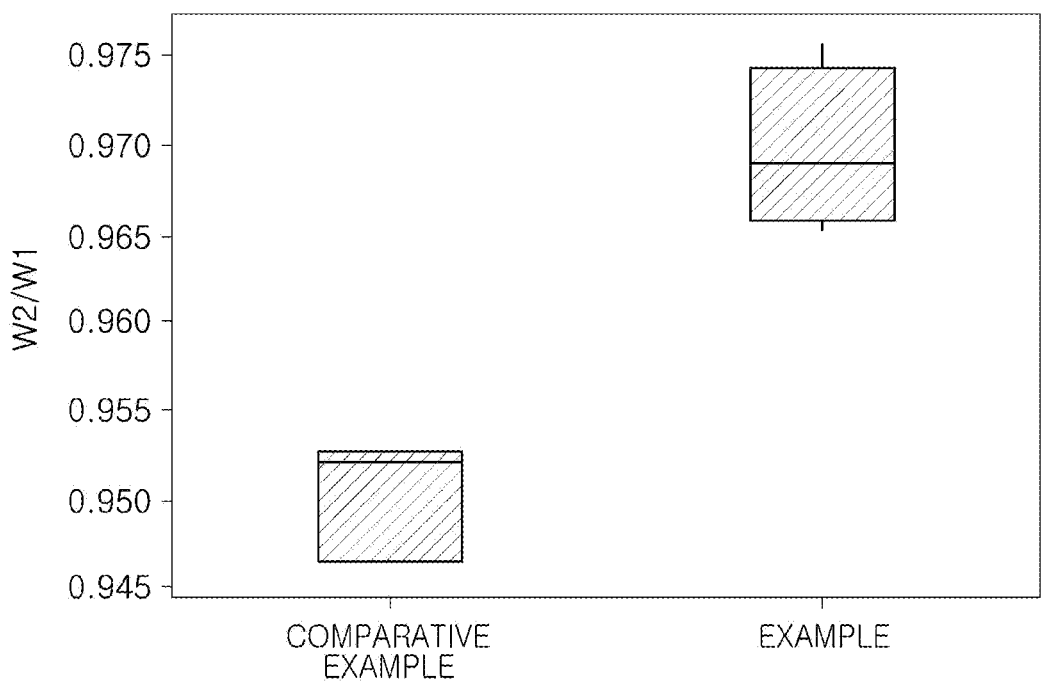
FIG. 14 is a graph comparing a range for a ratio of a minimum width to a maximum width of an internal electrode in a multilayer capacitor according to the related art with a range for a ratio of a minimum width to a maximum width of an internal electrode in a single stacked unit in a multilayer capacitor according to a second embodiment.

Referring to FIG. 14, Comparative Example is a multilayer capacitor including a capacitor body provided as a single body by stacking internal electrodes upwards from a lower end, rather than placing stacked units vertically. In addition, the Example is a second embodiment, and is a multilayer capacitor including a capacitor body 101' formed by vertically stacking the first and second stacked units 110' and 210'. In FIG. 6, W1 indicates a width of the longest internal electrode, while W2 indicates a width of the shortest internal electrode.

In the case of the Comparative Example, an upper limit value of W2/W1 is 0.953, a lower limit value is 0.947, an average value is 0.950, and W2/W1 is lower than 0.960 in all ranges. In the case of Example, an upper limit value is 0.976, a lower limit value is 0.965, and an average value is 0.970. Here, the average value of W2/W1 is higher than 0.960.

In other words, according to an embodiment, a deviation in width of an internal electrode when viewed as the whole of a capacitor body is reduced, but it is confirmed that a deviation in width of an internal electrode when viewed as each stacked unit is significantly reduced as compared with Comparative Example. As described above, according to an embodiment, a deviation in width and thickness of an internal electrode is reduced, so breakdown voltage characteristics are improved to provide a multilayer capacitor with high reliability, which is strong against dielectric breakdown.

Figure 7:
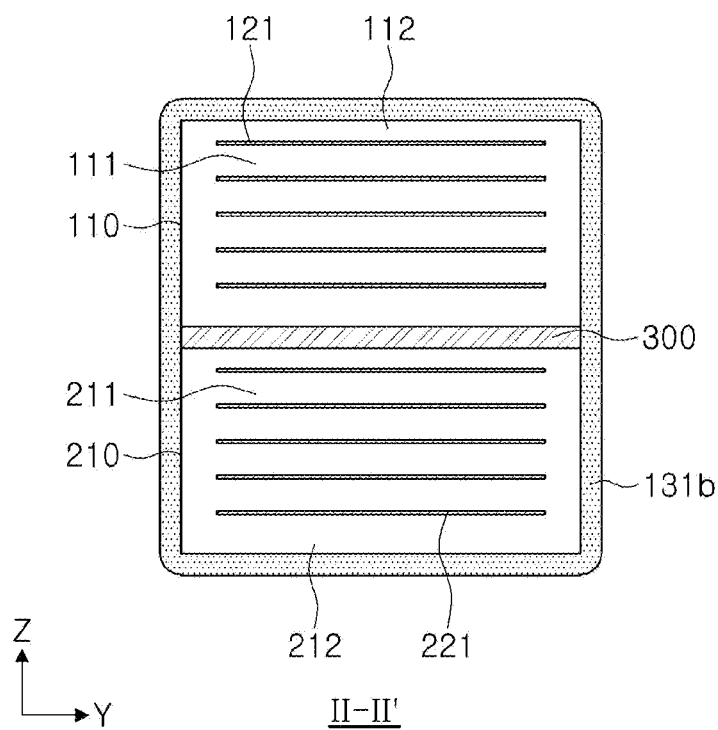
FIG. 7 is a cross-sectional view illustrating a cross section taken along line II-II' of FIG. 1 in a multilayer capacitor according to a third embodiment.
Figure 8:
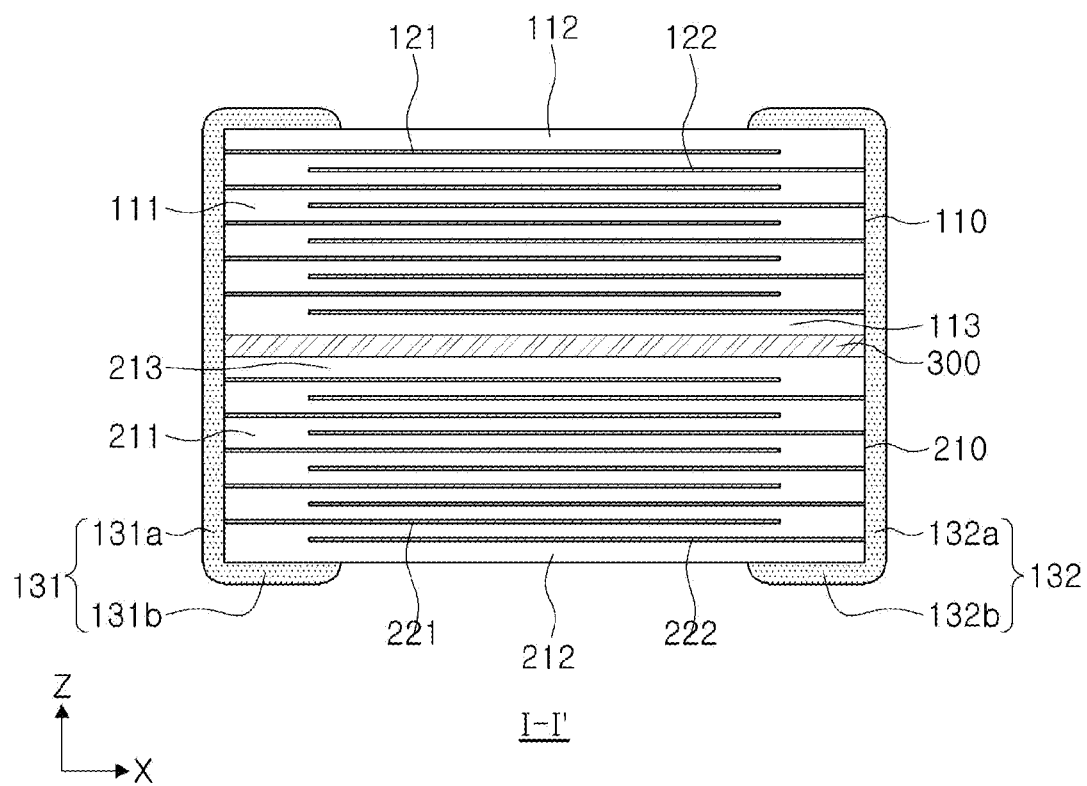
FIG. 8 is a cross-sectional view illustrating a cross section taken along line I-I' of FIG. 1 in a multilayer capacitor according to a third embodiment.

Meanwhile, according to another embodiment, as illustrated in FIGS. 7 and 8, a buffer layer 300 may be disposed between the first stacked unit 110 and the second stacked unit 210.

The buffer layer 300 is only formed of dielectric layers, thereby reducing the effect of a difference in level of the dielectric layer and the internal electrode to further suppress irregular deformation of the internal electrode.

Figure 9:
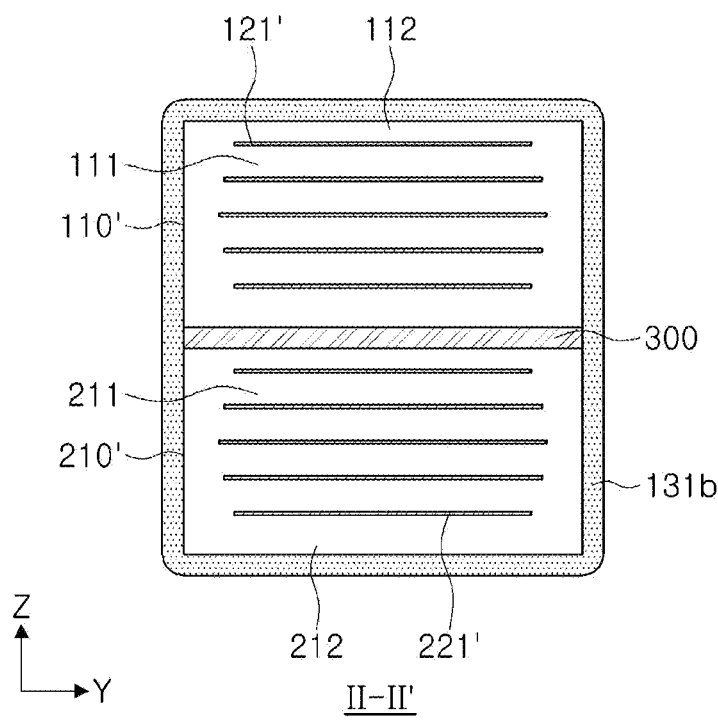
FIG. 9 is a cross-sectional view illustrating a cross section taken along line II-II' of FIG. 1 in a multilayer capacitor according to a fourth embodiment.

Referring to FIG. 9, a buffer layer 300 is disposed between a first stacked unit 110' and a second stacked unit 210', and the first and second stacked units 110' and 210' may be formed to allow a width of the first internal electrode or the second internal electrode to be narrower upwardly or downwardly in the Z direction from a middle portion of a stacked unit.

In other words, when viewed from a third surface of the first stacked unit 110', in a first internal electrode 121', a width of the first internal electrode 121' in the Y direction, disposed in the middle in the Z direction, is the longest, while a width of the first internal electrode 121' in the Y direction may be gradually shortened upwardly or downwardly in the Z direction.

Moreover, although not illustrated, when viewed from the fourth surface of the first stacked unit 110', in the case of a second internal electrode, a form and a structure thereof may be substantially similar to those of the first internal electrode 121'.

In addition, when viewed from a third surface of the second stacked unit 210', in a first internal electrode 221', a width of the first internal electrode 221' in the Y direction, disposed in the middle in the Z direction, is the longest, while a width of the first internal electrode 221' in the Y direction may be gradually shortened upwardly or downwardly in the Z direction.

Moreover, although not illustrated, when viewed from the fourth surface of the second stacked unit 210', in the case of a second internal electrode, a form and a structure thereof may be substantially similar to those of the first internal electrode 221'.

In this regard, when viewed from each of the third surface and the fourth surface of the capacitor body, an exposed shape of an internal electrode in the Z direction as a whole may be a snowman-like shape in the Z-direction.

Figure 10:
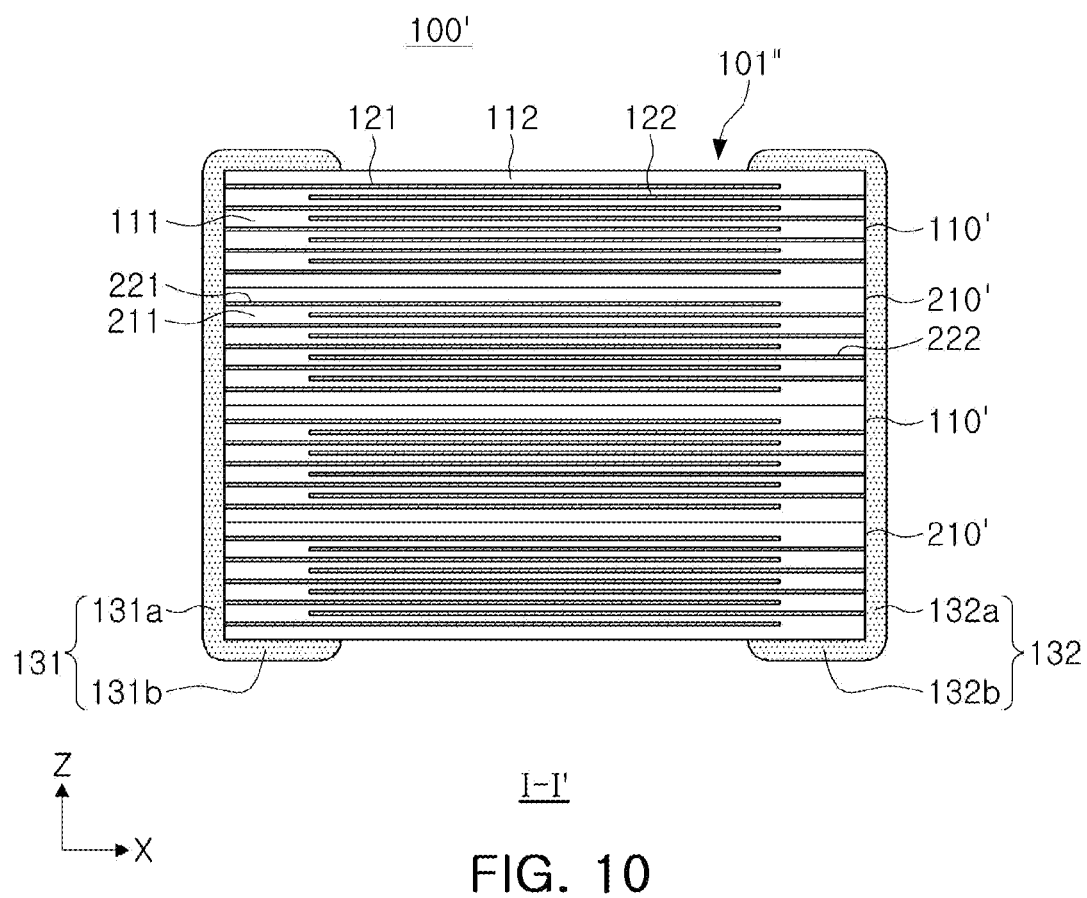
FIG. 10 is a cross-sectional view illustrating a cross section taken along line I-I' of FIG. 1 in a multilayer capacitor according to a fifth embodiment.
Figure 11:
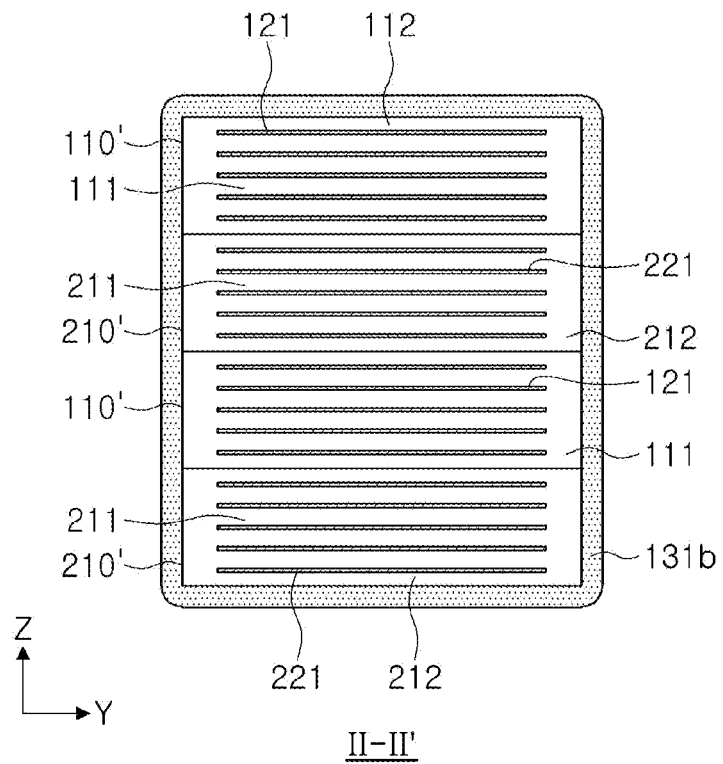
FIG. 11 is a cross-sectional view illustrating a cross section taken along line II-II' of FIG. 1 in a multilayer capacitor according to a fifth embodiment.

FIG. 10 is a cross-sectional view illustrating a cross section taken along line I-I' of FIG. 1 in a multilayer capacitor according to another embodiment, and FIG. 11 is a cross-sectional view illustrating a cross section taken along line II-II' of FIG. 1 in a multilayer capacitor according to another embodiment.

Referring to FIGS. 10 and 11, in a multilayer capacitor 100' according to an embodiment, a capacitor body 101" may include a plurality of first stacked units 110' and a plurality of second stacked units 210'.

Here, the first stacked unit 110' may have a structure in which a lower density portion is located in an upper portion.

In this case, the first stacked unit 110' may have a structure in which a final stacked portion is located in an upper portion.

Moreover, the second stacked unit 210' may have a structure in which a higher density portion is located in an upper portion.

In this case, the second stacked unit 210' may have a structure in which a first stacked portion is located in an upper portion.

In a state in which the second stacked unit 210' is located in a lowest layer, the first stacked unit 110' and the second stacked unit 210' may be alternately stacked one by one in the Z direction to form the capacitor body 101" according to an embodiment.

In this case, in order to manufacture a multilayer capacitor having an overall size similar to that of the above-described embodiment illustrated in FIG. 4, the number of dielectric layers and internal electrodes, included in each stacked unit, are required to be appropriately adjusted.

Figure 12:
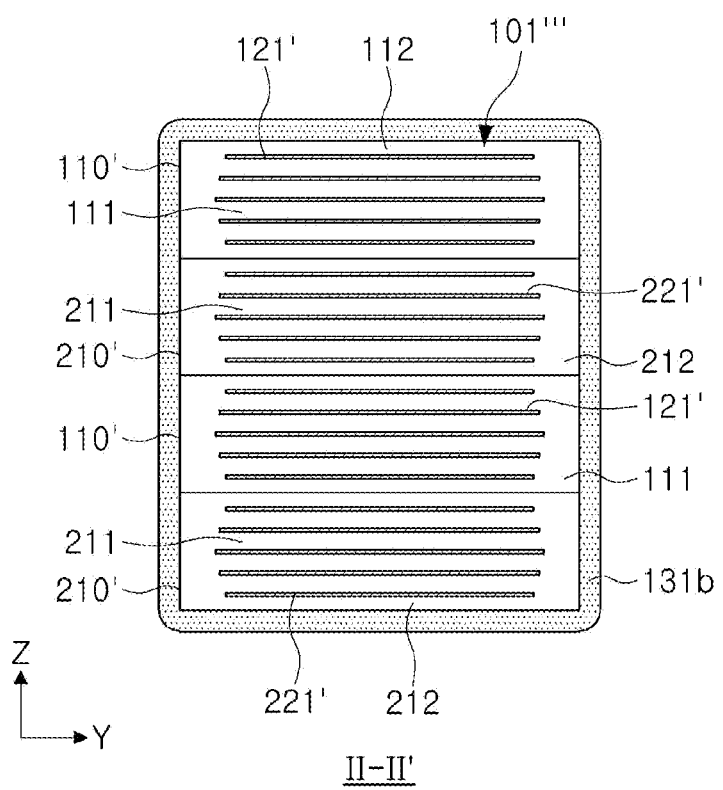
FIG. 12 is a cross-sectional view illustrating a cross section taken along line II-II' of FIG. 1 in a multilayer capacitor according to a sixth embodiment.

Meanwhile, as illustrated in FIG. 12, in the case in which a capacitor body 101''' includes a plurality of first and second stacked units 110' and 210', the first stacked unit 110' may be formed to allow a width of the first internal electrode or the second internal electrode to be narrower upwardly or downwardly in the Z direction from a middle portion of a stacked unit.

Moreover, the second stacked unit 210' may be formed to allow a width of the first internal electrode or the second internal electrode to be narrower upwardly or downwardly in the Z direction from a middle portion of a stacked unit.

Hereinafter, a method for manufacturing a multilayer capacitor according to an embodiment will be described.

First, a plurality of ceramic sheets are prepared.

A ceramic sheet is provided to form a dielectric layer of a stacked unit.

Ceramic powder, a polymer, and a solvent are mixed to prepare slurry, and the slurry is processed using a method such as a doctor blade, or the like, to provide the ceramic sheet in the form of a sheet having a thickness of several μm.

Then, conductive paste is printed on the ceramic sheet to a predetermined thickness to form an internal electrode and then a plurality of ceramic sheets are stacked, so a stacked bar, including a plurality of dielectric layers, and a plurality of first and second internal electrodes, alternately disposed with the dielectric layers interposed therebetween, is prepared.

Then, two stacked bars are disposed in a row to allow surfaces, corresponding to a higher density portion, to be adjacent to each other, or surfaces, corresponding to a lower density portion, to be adjacent to each other, so as to prepare a stack.

In this case, the stacking pressure which the ceramic sheet receives is accumulated. Thus, density is the highest in a surface, stacked firstly, while density is the lowest in a surface, stacked finally.

Thus, when the stack is prepared, two stacked bars may be disposed in a row to allow surfaces, on which ceramic sheets are stacked firstly, to be adjacent to each other, or may be disposed in a row to allow surfaces, on which ceramic sheets are stacked finally, to be adjacent to each other.

In an embodiment, a second stacked bar in which a higher density portion is located in an upper portion is disposed, and then a first stacked bar in which a lower density portion is located in an upper portion is stacked above the second stacked bar so as to form a stack.

In other words, a second stacked bar, in which a surface with a firstly stacked ceramic sheet is located in an upper portion, is disposed, and then a first stacked bar, in which a surface with a finally stacked ceramic sheet is located in an upper portion, is stacked above the second stacked bar so as to form the stack.

In this case, for alignment of stacked bars vertically disposed, a hole is processed using a laser drill in each stacked bar, and a matching stacker, or the like, may be used.

Meanwhile, if necessary, a buffer layer is further disposed between stacked bars, vertically adjacent to each other, to form the stack.

To this end, one or more ceramic sheets are stacked on an upper surface of a second stacked bar in a lower side to form a buffer layer, and then a first stacked bar may be stacked above the buffer layer.

Moreover, as another embodiment, in preparing the stack, the stack includes a plurality of first and second stacked bars, and may be formed by stacking the first stacked bar and the second stacked bar in the Z direction to be alternately disposed one after another.

Then, the stack is pressed.

The stack may be provided to have a form in which a width of the first internal electrode or the second internal electrode is gradually reduced upwardly or downwardly from a middle portion of the first and second stacked bars.

Then, the compressed stack is cut for each region corresponding to a single capacitor to allow first and second internal electrodes to be alternately exposed through both ends, and is then sintered at high temperature to prepare a capacitor body.

Then, conductive paste is applied to electrically connect the capacitor body to each of exposed portions of the first and second internal electrodes to form first and second external electrodes.

An active region is formed above a lower cover, and an upper cover is stacked above the active region and pressed to manufacture a multilayer capacitor according to the related art.

Recently, as a dielectric layer is thinned and the stacking number of dielectric layers is increased, a difference in thickness between an active region in which an internal electrode is formed and a margin portion in which an internal electrode is not formed is increased in a capacitor body.

The difference in thickness is more significant in a width direction than in a length direction of a multilayer capacitor.

Thus, when a multilayer capacitor is manufactured, interlayer disruption is caused in stacking and pressing processes. Thus, interlayer delamination or cracking occurs in a margin portion, and moisture, a plating solution and foreign matters penetrate into the interior of a capacitor body, so reliability of the capacitor body may be reduced.

Moreover, in a multilayer capacitor according to the related art, a capacitor body after compression has a potbelly shape in which a middle portion of an active region is protruding more than upper and lower portions of the active region.

The form described above is generated by the difference in level of the dielectric layer and the internal electrode, described above, and the difference in density between upper and lower portions of a margin portion.

In other words, when a stack is pressed, stretching of upper and lower portions of an active region in a lateral direction is limited, but a middle portion of the active region is further stretched in a lateral direction.

Thus, in a capacitor body, a thickness of an internal electrode is increased more toward a lower side of an active region, and the thickness of the internal electrode is increased toward a margin portion.

In this case, a thickness of the dielectric layer tends to be opposite to that of the internal electrode, so an active region of the capacitor body has a potbelly shape as a whole.

When the active region of the capacitor body has a potbelly shape as a whole as described above, a multilayer capacitor may be vulnerable to a dielectric breakdown defect or a short defect.

In other words, in a multilayer capacitor according to the related art, when a stack is pressed, density of a dielectric layer, located in a lower portion, is increased. In the case, an internal electrode, adjacent to a lower portion with high density, is stretched less, and an internal electrode, adjacent to an upper portion with low density, is stretched less since pressed subsidiary materials and an upper cover are pushed downwards.

However, in the case of a middle portion of a capacitor body, density of a margin is relatively low, so an internal electrode may be stretched freely. Thus, the internal electrode of the capacitor body is deformed to have a potbelly shape as a whole.

Moreover, when a dielectric layer is thinned, a voltage per unit thickness of the dielectric layer becomes higher.

Thus, even when a low voltage is applied to a multilayer capacitor, the probability of occurrence of dielectric breakdown of the dielectric layer may be increased.

In detail, when viewed from a cross section in width and thickness directions of a multilayer capacitor, both end portions of an internal electrode in a width direction have a wedge shape while an internal electrode is stretched in a compression process, so field strength is further increased by a notch effect.

Thus, there may be a problem in which dielectric breakdown of a dielectric layer may more easily occur while high field strength is overlapped in an end portion of an internal electrode adjacent in a stacking direction.

However, in a multilayer capacitor according to an embodiment, a capacitor body includes two stacked units, and the two stacked units are disposed in a row to allow surfaces, corresponding to high density, to be adjacent to each other and are then pressed to manufacture the capacitor body.

Here, in a capacitor body, density of a margin is high in a middle portion of an active region, so an internal electrode is not significantly stretched. On the other hand, density of a margin is low in upper and lower portions of the active region, while stretching of an internal electrode is limited by a cover. In this regard, internal electrodes, included in the capacitor body, may be uniformly deformed as a whole.

As described above, when the internal electrode is deformed to have a vertically symmetrical and a uniform structure, a thickness deviation between a dielectric layer and an internal electrode in a capacitor body may be reduced, and a phenomenon in which an end of an internal electrode is bent may be reduced.

Thus, an effect of a difference in thickness between an active region and a margin portion in a width direction of a multilayer capacitor is reduced, so miniaturization and high capacity of a multilayer capacitor may be implemented, and interlayer delamination or cracking, mainly occurring in a margin portion due to interlayer disruption in stacking and pressing processes, may be prevented.

Moreover, reliability of a multilayer capacitor may be improved, and dielectric breakdown may be prevented under high pressure.

Meanwhile, in an embodiment, the number of stacked units, forming a capacitor body, is not limited to two, and the number of stacked units may be three or more, and preferably, the number of stacked units may be a multiple of two.

For example, as illustrated in FIGS. 10 and 11, when the total number of stacked units is increased as four, 2 times as compared with the embodiment described above, internal electrodes may be further uniformly deformed as a whole. Thus, a thickness deviation between a dielectric layer and an internal electrode in a capacitor body may be further reduced, and a phenomenon in which an end of an internal electrode is bent may be further reduced.

Thus, problems such as dielectric breakdown of a multilayer capacitor 100', a short defect, capacity reduction, and the like, may be further effectively solved, and reliability of a multilayer capacitor may be further increased.

Figure 13:
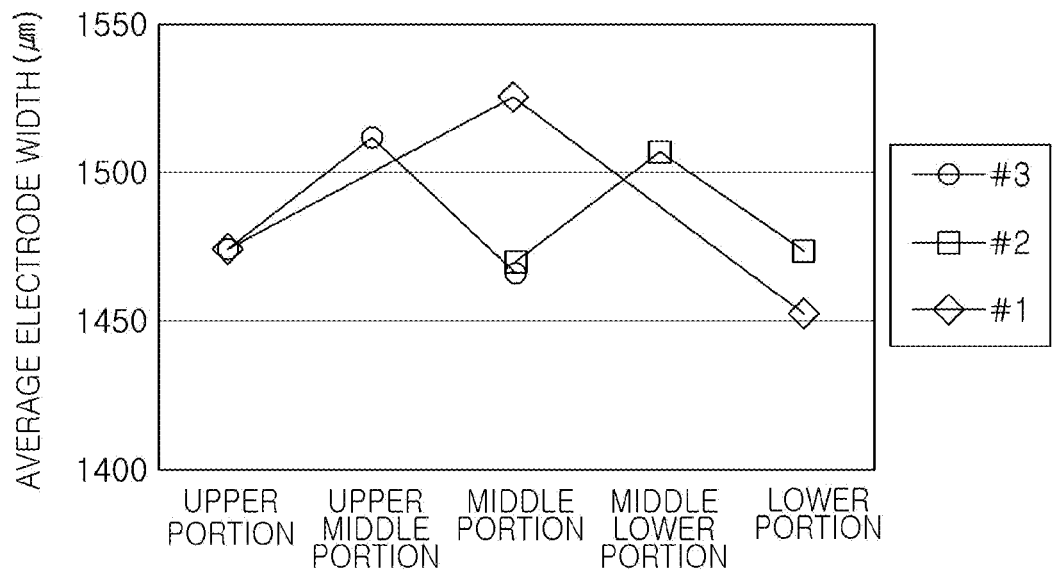
FIG. 13 is a graph comparing a range of widths of an internal electrode in a multilayer capacitor according to the related art with a range of widths of an internal electrode in a multilayer capacitor according to a first embodiment.

FIG. 13 is a graph comparing a range of widths of an internal electrode in a multilayer capacitor according to the related art with a range of widths of an internal electrode in a multilayer capacitor according to an embodiment illustrated in each of FIGS. 1 to 5. Here, a length and a width of a multilayer capacitor are 2.0 mm and 1.2 mm, respectively, and the stacking number of internal electrodes is a total of 900 layers.

In FIG. 13, #1 illustrates a width of internal electrodes in a multilayer capacitor according to the related art, in which a capacitor body is formed of a single stack, #2 illustrates a width of internal electrodes included in a second stacked unit in a multilayer capacitor illustrated in FIGS. 1 to 5, and #3 illustrates a width of internal electrodes included in a first stacked unit in a multilayer capacitor illustrated in FIGS. 1 to 5.

Referring to FIG. 13, a maximum value and a minimum value of an average width of internal electrodes of each of #2 and #3 are lower than a maximum value and a minimum value of an average width of internal electrodes of #1.

Moreover, in the case of #1, an average electrode width in an upper portion and a lower portion of a capacitor body is the lowest, and a width in a middle point is the highest. On the other hand, in the case of an embodiment of the present disclosure including #2 and #3, widths in an upper portion, a middle portion, and a lower portion of a capacitor body are substantially similar to each other, and widths of an upper middle portion and a middle lower portion are substantially similar to each other.

In other words, according to an embodiment, a thickness deviation of an internal electrode in an active region of a capacitor body may be reduced, and it may be confirmed that a potbelly shape, a form of an internal electrode of a capacitor body, is numerically improved in a multilayer capacitor according to the related art.

As set forth above, according to an embodiment in the present disclosure, after two or more ceramic stacked units are manufactured, the stacked units are disposed in a row to allow firstly stacked surfaces to be adjacent to each other or finally stacked surfaces to be adjacent to each other and then are pressed to form a capacitor body, so a thickness deviation of an internal electrode and a dielectric layer in the entirety of the capacitor body may be reduced and end bending of the internal electrode may be reduced.

While exemplary embodiments have been shown and described above, it will be apparent to those skilled in the art that modifications and variations could be made without departing from the scope of the present invention as defined by the appended claims.

What is claimed is:

1. A multilayer capacitor, comprising:
   a capacitor body formed by placing two or more stacked units in a row in a stacking direction of dielectric layers, each stacked unit including a plurality of dielectric layers, and a plurality of first and second internal electrodes alternately disposed with the dielectric layers interposed therebetween; and first and second external electrodes disposed on the capacitor body to be electrically connected to the first and second internal electrodes, respectively, wherein the capacitor body includes a pair of adjacent stacked units comprising a first stacked unit and a second stacked unit, each of the first and second stacked units having a higher density portion and a lower density portion of the dielectric layers, and the higher density portions of the first and second stacked units are adjacent to each other.

2. The multilayer capacitor of claim 1, wherein the capacitor body further includes a buffer layer disposed between the adjacent stacked units.

3. The multilayer capacitor of claim 1, wherein the lower density portion of the dielectric layers of the first stacked unit is located in an upper portion of the first stacked unit in the stacking direction, and the second stacked unit is disposed in a lower side of the first stacked unit in the stacking direction, and the higher density portion of the dielectric layers of the second stacked unit is located in an upper portion of the second stacked unit in the stacking direction.

4. The multilayer capacitor of claim 1, wherein the higher density portion and the lower density portion of the dielectric layers of the first stacked unit are located in a lower portion and an upper portion, respectively, of the first stacked unit in the stacking direction, and the second stacked unit is disposed in a lower side of the first stacked unit in the stacking direction, and the higher density portion and the lower density portion of the dielectric layers of the second stacked unit are located in an upper portion and a lower portion, respectively, of the second stacked unit in the stacking direction, such that the higher density portion of the first stacked unit and the higher density portion of the second stacked unit are adjacent to each other.

5. The multilayer capacitor of claim 1, wherein the lower density portion of the dielectric layers of the first stacked unit is located in an upper portion of the first stacked unit in the stacking direction, and the second stacked unit is disposed in a lower side of the first stacked unit in the stacking direction, and the higher density portion of the dielectric layers of the second stacked unit is located in an upper portion of the second stacked unit in the stacking direction, and the first stacked unit and the second stacked unit are alternately stacked one after another.

6. A multilayer capacitor, comprising:

a capacitor body including two or more stacked units stacked in a row in a stacking direction of dielectric layers, each of the two or more stacked units including a plurality of dielectric layers and a plurality of first and second internal electrodes alternately disposed with a respective dielectric layer interposed therebetween; and first and second external electrodes disposed on the capacitor body and electrically connected to the first and second internal electrodes, respectively, wherein in each of the two or more stacked units, lengths of the plurality of first and second internal electrodes in a width direction of the capacitor body become less upwardly or downwardly from a middle portion of each of the two or more stacked units, and wherein each of the two or more stacked units satisfies W2/W1>0.96, where a maximum length of an internal electrode among the plurality of first and second internal electrodes in the width direction is defined as "W1", and a minimum length of an internal electrode among the plurality of first and second internal electrodes in the width direction is defined as "W2".

7. The multilayer capacitor of claim 6, wherein the capacitor body further includes a buffer layer disposed between a pair of adjacent stacked units.

8. A method for manufacturing a multilayer capacitor, comprising:

preparing a stacked bar including a plurality of ceramic sheets and a plurality of first and second internal electrodes alternately disposed with a respective ceramic sheet interposed therebetween;

preparing a stack by placing two or more stacked bars in a row such that surfaces of the two or more stacked bars, corresponding to a higher density portion of the ceramic sheets or to a lower density portion of the ceramic sheets, are adjacent to each other;

compressing the stack;

preparing a capacitor body by cutting and sintering the compressed stack to expose portions of the plurality of first and second internal electrodes; and forming first and second external electrodes on the capacitor body to be electrically connected to the exposed portions of the plurality of first and second internal electrodes, respectively.

9. The method for manufacturing a multilayer capacitor of claim 8, wherein, in the preparing of the stack, the stack is formed by placing a buffer layer between adjacent stacked bars.

10. The method for manufacturing a multilayer capacitor of claim 8, wherein, in the preparing of the stack, the stack is formed by placing a first stacked bar having a higher density portion of the ceramic sheets located in an upper portion of the first stacked bar, and stacking a second stacked bar above the first stacked bar, in which a lower density portion of the ceramic sheets is located in an upper portion of the second stacked bar.

11. The method for manufacturing a multilayer capacitor of claim 10, wherein the stack includes a plurality of first and second stacked bars, and is formed by stacking the first stacked bar and the second stacked bar to be alternately disposed one after another.

12. The method for manufacturing a multilayer capacitor of claim 8, wherein, in the preparing of the stack, alignment of the stacked bar is performed using a matching stacker, after a hole is processed in each of the stacked bars with a laser drill.

13. A method for manufacturing a multilayer capacitor, comprising:

preparing a stacked bar including a plurality of ceramic sheets and a plurality of first and second internal electrodes alternately disposed with a respective ceramic sheet interposed therebetween; preparing a stack by placing two or more stacked bars in a row such that surfaces of the two or more stacked bars, on which ceramic sheets are stacked firstly, are adjacent to each other, or that surfaces of the two or more stacked bars, on which ceramic sheets are stacked finally, are adjacent to each other; compressing the stack; preparing a capacitor body by cutting and sintering the compressed stack to expose portions of the plurality of first and second internal electrodes; and forming first and second external electrodes on the capacitor body to be electrically connected to the exposed portions of the plurality of first and second internal electrodes, respectively, and wherein each of the two or more stacked units satisfies W2/W1>0.96, where a maximum length of an internal electrode among the plurality of first and second internal electrodes in the width direction is defined as "W1", and a minimum length of an internal electrode among the plurality of first and second internal electrodes in the width direction is defined as "W2".

14. The method for manufacturing a multilayer capacitor of claim 13, wherein, in the preparing of the stack, the stack is formed by placing a buffer layer between adjacent stacked bars.

15. The method for manufacturing a multilayer capacitor of claim 13, wherein, in the preparing of the stack, the stack is formed by placing a first stacked bar having a surface with a firstly stacked ceramic sheet located in an upper portion of the first stacked bar, and by stacking a second stacked bar above the first stacked bar, in which a surface with a finally stacked ceramic sheet located in an upper portion of the second stacked bar.

16. The method for manufacturing a multilayer capacitor of claim 15, wherein the stack includes a plurality of first and second stacked bars, and is formed by stacking the first stacked bar and the second stacked bar to be alternately disposed one after another.

17. The method for manufacturing a multilayer capacitor of claim 13, wherein, in the preparing of the stack, alignment of the stacked bar is performed using a matching stacker, after a hole is processed in each of the stacked bars with a laser drill.

\* \* \* \* \*